(12) United States Patent
Kakehi et al.

(10) Patent No.: US 8,799,321 B2
(45) Date of Patent: Aug. 5, 2014

(54) LICENSE MANAGEMENT APPARATUS, LICENSE MANAGEMENT METHOD, AND COMPUTER READABLE MEDIUM

(75) Inventors: Rumiko Kakehi, Tokyo (JP); Masaki Kyojima, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1060 days.

(21) Appl. No.: 12/425,203

(22) Filed: Apr. 16, 2009

(65) Prior Publication Data

US 2010/0169982 A1 Jul. 1, 2010

(30) Foreign Application Priority Data

Dec. 25, 2008 (JP) ................. 2008-331238

(51) Int. Cl.
*G06Q 99/00* (2006.01)
*H04L 29/06* (2006.01)

(52) U.S. Cl.
CPC ..... *H04L 29/06823* (2013.01); *H04L 29/06829* (2013.01); *H04L 29/06843* (2013.01); *G06G 2220/12* (2013.01); *G06Q 2220/18* (2013.01)
USPC ............. 707/785; 707/781; 707/783; 705/51; 705/59; 726/2; 709/225

(58) Field of Classification Search
USPC ........... 705/59, 51; 707/781, 783, 785; 726/2; 709/225
See application file for complete search history.

(56) References Cited

U.S. PATENT DOCUMENTS

| | | | | |
|---|---|---|---|---|
| 5,905,860 A | * | 5/1999 | Olsen et al. | 726/27 |
| 6,510,513 B1 | * | 1/2003 | Danieli | 713/156 |
| 6,735,701 B1 | * | 5/2004 | Jacobson | 726/1 |
| 7,085,834 B2 | * | 8/2006 | Delany et al. | 709/225 |
| 7,308,717 B2 | * | 12/2007 | Koved et al. | 726/27 |
| 7,748,030 B1 | * | 6/2010 | Selberg et al. | 726/7 |
| 7,752,431 B2 | * | 7/2010 | Della-Libera et al. | 713/151 |
| 2002/0107806 A1 | | 8/2002 | Higashi et al. | |
| 2004/0039594 A1 | * | 2/2004 | Narasimhan et al. | 705/1 |
| 2004/0066274 A1 | * | 4/2004 | Bailey | 340/5.3 |
| 2004/0148514 A1 | * | 7/2004 | Fee et al. | 713/200 |
| 2005/0021622 A1 | * | 1/2005 | Cullen | 709/204 |
| 2005/0021980 A1 | * | 1/2005 | Kanai | 713/182 |
| 2006/0294580 A1 | * | 12/2006 | Yeh, Jr. | 726/3 |
| 2007/0043679 A1 | * | 2/2007 | Le et al. | 705/59 |
| 2007/0100768 A1 | * | 5/2007 | Boccon-Gibod et al. | 705/59 |
| 2007/0143827 A1 | * | 6/2007 | Nicodemus et al. | 726/2 |
| 2007/0150299 A1 | * | 6/2007 | Flory | 705/1 |
| 2007/0180490 A1 | * | 8/2007 | Renzi et al. | 726/1 |
| 2007/0185814 A1 | * | 8/2007 | Boccon-Gibod et al. | 705/51 |
| 2007/0185815 A1 | * | 8/2007 | Boccon-Gibod et al. | 705/51 |
| 2008/0134308 A1 | * | 6/2008 | Yalakanti et al. | 726/6 |
| 2008/0256593 A1 | * | 10/2008 | Vinberg et al. | 726/1 |
| 2009/0037998 A1 | * | 2/2009 | Adhya et al. | 726/11 |
| 2009/0077618 A1 | * | 3/2009 | Pearce et al. | 726/1 |
| 2009/0083831 A1 | * | 3/2009 | Kanai | 726/1 |
| 2009/0106433 A1 | * | 4/2009 | Knouse et al. | 709/229 |
| 2009/0327498 A1 | * | 12/2009 | Sampath et al. | 709/228 |

FOREIGN PATENT DOCUMENTS

JP 10-93550 A 4/1998
JP 2002-342518 A 11/2002

* cited by examiner

*Primary Examiner* — James D Nigh

(74) *Attorney, Agent, or Firm* — Sughrue Mion, PLLC

(57) ABSTRACT

A license management apparatus includes: a license information storage; a reproduced user information storage; an invalidation information storage; a compare unit; an update unit; and a setting unit.

10 Claims, 7 Drawing Sheets

FIG. 3

USER INFORMATION (PERSONAL INFORMATION)

| USER ID | BELONGING GROUP | OTHER INFORMATION |
|---|---|---|
| U001 | G001, G002 | |
| U002 | G001 | |

GROUP INFORMATION

| GROUP ID | NAME OF GROUP | MEMBER |
|---|---|---|
| G001 | BUSINESS 1G | U001, U002, ··· |

FIG. 4

USER INFORMATION

| USER ID | BELONGING GROUP | CONTENT CHANGE INFORMATION |
|---|---|---|
| U001 | G001 | DELETION OF GROUP MEMBER |
| U002 | G001 | DELETION OF MEMBER |
| U003 | | |

FIG. 5

CHANGE LOG

| USER ID | CHANGE STORAGE INFORMATION | |
|---|---|---|
| | CONTENT CHANGE INFORMATION | CHANGE DATA |
| · | · | · |
| · | · | · |
| · | · | · |
| U001 | DELETION OF GROUP MEMBER | GroupA |
| U002 | DELETION OF MEMBER | |
| · | · | · |
| · | · | · |
| · | · | · |

FIG. 6

POLICY INFORMATION

| POLICY ID | TARGET | RIGHT | TERM OF VALIDITY |
|---|---|---|---|
| p001 | GroupA | PRINT | INDEFINITE |
|  | GroupB | EDIT | INDEFINITE |
| p002 | UserA | READ | 2010.12.31 23:59:59 |

FIG. 7

INVALIDATION CONDITION

|  | CONTENT CHANGE INFORMATION | RULE |
|---|---|---|
| 1 | DELETION OF USER | INVALIDATE ALL LICENSES ISSUED TO USER DELETED |
| 2 | DELETION OF GROUP MEMBER | INVALIDATE ALL LICENSES ISSUED TO DELETED MEMBER UNDER POLICY IN WHICH RIGHT IS SET FOR GROUP OF DELETED MEMBER |
| 3 | ADDITION OF GROUP MEMBER | INVALIDATE ALL LICENSES ISSUED TO ADDED MEMBER UNDER POLICY IN WHICH RIGHT IS SET FOR BOTH OF GROUP AND MEMBER |
| 4 | DELETION OF GROUP | INVALIDATE ALL LICENSES ISSUED TO DELETED GROUP UNDER POLITY IN WHICH RIGHT IS SET FOR GROUP |

FIG. 8

LICENSE INFORMATION

| LICENSE ID | USER ID | POLICY ID | VALIDITY SETTING INFORMATION |
|---|---|---|---|
| 1 | UserA | p001 | VALID |
| 2 | UserA | p002 | VALID |
| 3 | UserB | p001 | VALID |
| 4 | UserC | p003 | VALID |

US 8,799,321 B2

LICENSE MANAGEMENT APPARATUS, LICENSE MANAGEMENT METHOD, AND COMPUTER READABLE MEDIUM

CROSS-REFERENCE TO RELATED APPLICATIONS

This application is based on and claims priority under 35 U.S.C. 119 from Japanese Patent Application No. 2008-331238 filed Dec. 25, 2008.

BACKGROUND

1. Technical Field

The present invention relates to a license management apparatus, a license management method, and a computer readable medium.

SUMMARY

According to an aspect of the present invention, a license management apparatus includes: a license information storage that stores license information generated for each license issued to a user; a reproduced user information storage that stores user information managed by a user management apparatus or reproduced user information consisting of a reproduced version of a portion of the user information in such a manner that change content information for specifying content of a change executed on the user information is made to correspond to the user information; an invalidation information storage that associates each of pieces of the content change information with license invalidation rules generated due to the change made on the user information, and that stores the each of pieces of the content change information associated with the license invalidation rules; a compare unit that obtains user information corresponding to the reproduced user information stored in the reproduced user information storage from the user management apparatus, and that compares the obtained user information with the reproduced user information; an update unit that, when a comparison result obtained by the compare unit shows that the user information and the reproduced user information do not coincide with each other, specifies the content of the change made on the user information, and that, according to not only the content change information corresponding to the specified content change but also the user information, updates the content change information and the reproduced user information stored in the reproduced user information storage; and a setting unit that, of the each of pieces of license information stored in the license information storage, sets the license information invalid according to an invalidation rule corresponding to the change content information updated by the update unit with reference to the invalidation information storage.

BRIEF DESCRIPTION OF THE DRAWINGS

Exemplary embodiment of the present invention will be described in detail based on the following figures, wherein:

FIG. 3 is a view of the data structure example of user information stored in the user information database of a user management server according to the present embodiment;

FIG. 4 is a view of the data structure example of user information stored in the user information database of a license server according to the present embodiment;

FIG. 5 is a view of the data structure example of a change log stored in a user information change log database according to the present embodiment;

FIG. 6 is a view of the data structure example of policy information stored in a policy database according to the present embodiment;

FIG. 7 is a view of the data setting example of an invalidation condition stored in an invalidation condition list storage portion according to the present embodiment;

FIG. 8 is a view of the data structure example of license information stored in a license database according to the present embodiment;

DETAILED DESCRIPTION

Now, description will be given below of a preferred embodiment of the invention with reference to the accompanying drawings.

Figure 1:
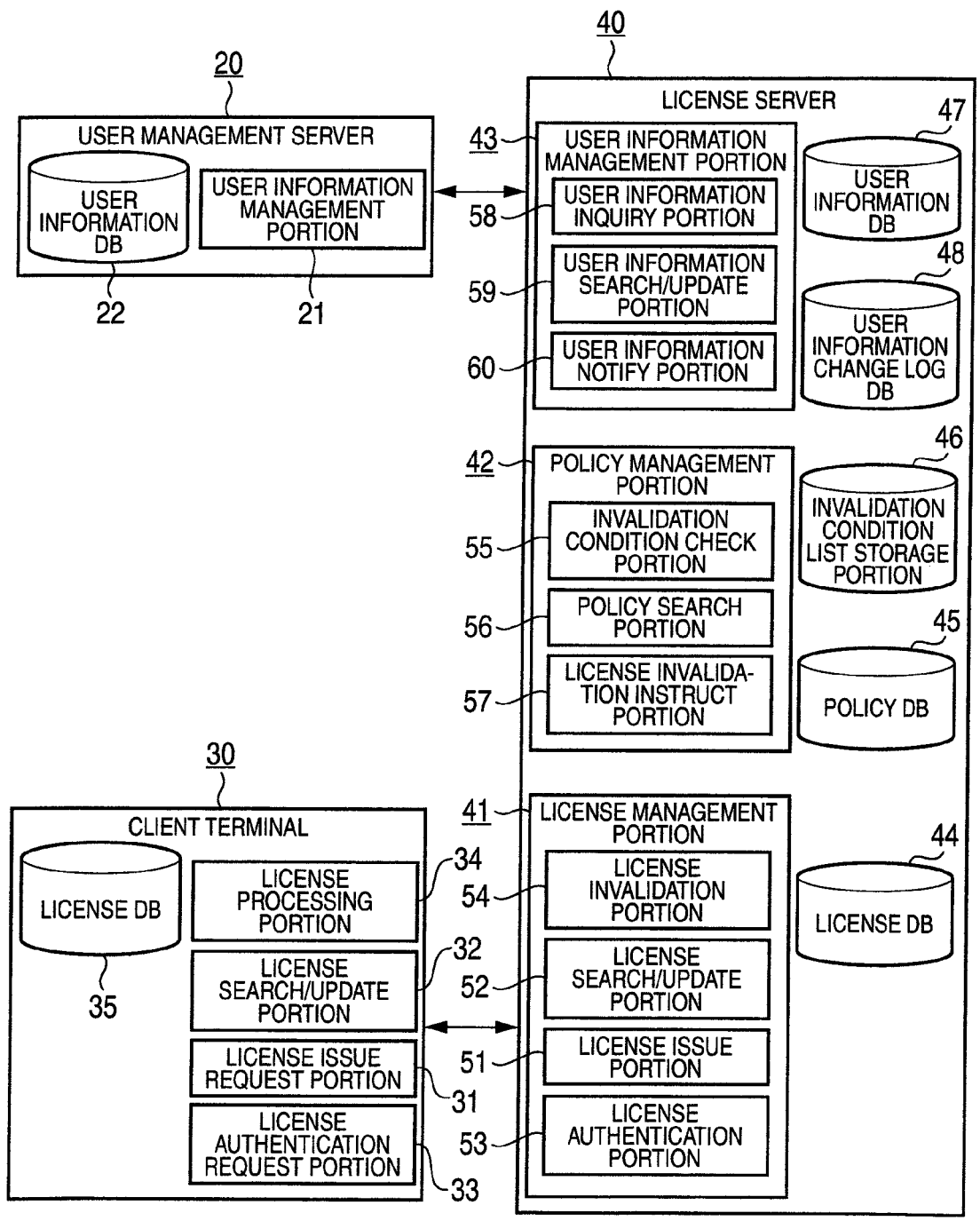
FIG. 1 is a block structure view of a license management system including an embodiment of a license management apparatus according to the invention.

FIG. 1 is a block diagram of a license management system including an embodiment of a license management apparatus according to the invention. In FIG. 1, there are shown a user management server 20 serving as a user management apparatus for managing information about a user who uses license-managed contents, a client terminal 30 to be used by the user, and a license server 40 serving as a license management apparatus for managing licenses.

Figure 2:
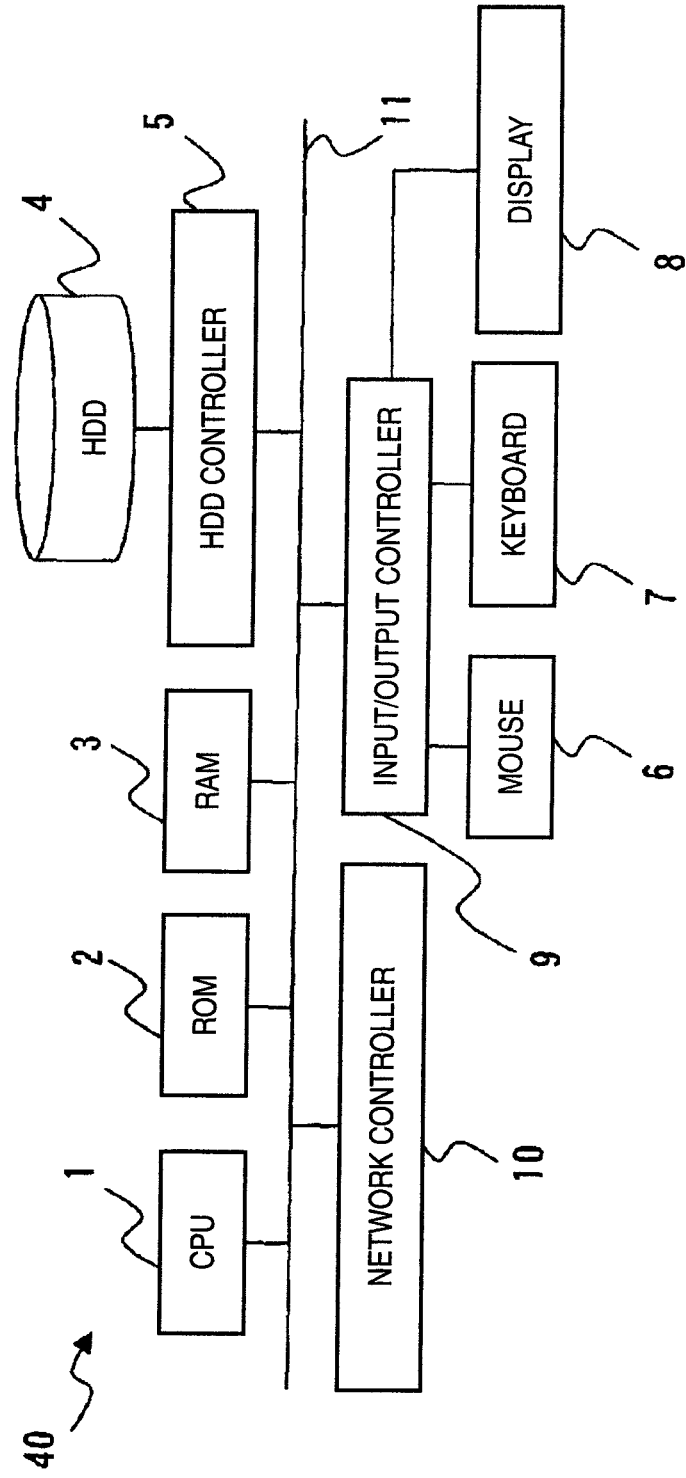
FIG. 2 is a hardware structure view of a server computer which forms a license server according to the present embodiment.

FIG. 2 is a structure view of the hardware of a server computer which constitutes the license server 40 according to the present embodiment. The server computer, which constitutes the license server 40 in the present embodiment, can be realized by a general-purpose hardware structure which has been known conventionally. That is, the present computer, as shown in FIG. 2, includes a CPU 1, a ROM 2, RAM 3, an HDD controller 5 with a hard disk drive (HDD) 4 connected thereto, an input/output controller 9 with a mouse 6 and a key board 7 provided as input unit connected thereto and also with a display 8 provided as a display device connected thereto, and an internal bus 11 with a network controller 10 connected thereto, while the network controller 10 is used as communication unit. Here, since the user management server 20 and client terminal 30 are also made of computers respectively, the hardware structures thereof can also be illustrated in the same manner as shown in FIG. 2.

Referring back again to FIG. 1, the user management server 20 includes a user information database (DB) 22 for storing user information and a user information management portion 21 used to carry out information management relating to the user information: for example, the user information management portion 21 adds or deletes user information stored in the user information database, and supplies the user information to other devices. The user information management portion 21 can be realized by a cooperative operation to be carried out by the computer constituting the user management server 20 and a program to be executed by the CPU 1 incorporated in the computer. Also, the user information data base 22 can be realized by the HDD 4 incorporated in the user management server 20.

The client terminal 30 includes a license database (DB) 35 for storing information about a license issued by the license server 40, a license issue request portion 31 for sending a license issue request to the license server 40, a license search/update portion 32 for storing an issued license into the license database 35 and also for searching the license stored in the license database 35, a license authentication request portion 33 for sending the authentication request of the issued license to the license server 40, and a license processing portion 34 which, when the contents are used in the client terminal 30, cooperates together with other structure elements in carrying out a license management processing in the client terminal 30. The respective structure elements 31 to 34 of the client terminal 30 can be realized by a cooperative operation between the computer constituting the client terminal 30 and a program to be executed by the CPU 1 incorporated in the computer. Also, the license database 35 can be realized by an external storage device incorporated in the client terminal 30.

The license server 40 includes a license management portion 41, a policy management portion 42, a user information management portion 43, a license database (DB) 44, a policy database (DB) 45, an invalidation condition list storage portion 46, a user information database (DB) 47, and a user information change log database (DB) 48.

The license management portion 41 is a unit which is used to manage a license issued to a user. Specifically, it includes a license issue portion 51, a license search/update portion 52, a license authentication portion 53, and a license invalidation portion 54. The license issue portion 51 functions not only as a check unit which checks whether a license may be issued or not according to a policy obtained but also as a license issue unit which, when the issue of the license is permitted, issues the license. The license search/update portion 52 accesses license information stored in the license data base 44; for example, it functions as a storage which stores license information about a license issued into the license data base 44. The license authentication portion 53 functions not only as an accept unit for accepting a license authentication request including at least a user ID serving as user identification information and a license ID serving as license identification information, but also as a determining unit which cooperates with the license search/update unit 52 to search the license data base 44 according to the user ID and license ID included in the license authentication request to thereby determine whether the present license is valid or not. The license invalidation portion 54 functions as a setting unit which cooperates with the license search/update portion 52 to set the license information invalid.

The policy management portion 42 is a unit for managing policies respectively set in the policy database 45; and, specifically, it includes an invalidation condition check portion 55, a policy search portion 56, and a license invalidation instruct portion 57. The invalidation condition check portion 55 specifies the invalidation condition of a license with reference to the invalidation condition list storage portion 46 and, according to the thus specified invalidation condition, generates a search condition for a policy related to the present user. The policy search portion 56 functions as a policy obtain unit which, according to the policy received from the invalidation condition check portion 55, searches the policy data base 45 to thereby obtain a policy related to the present user. The license invalidation instruct portion 57 outputs, to the license invalidation portion 54, an invalidation instruction including a policy, user information and a change log, while the invalidation instruction is the information used to specify which license should be made invalid.

The user information management portion 43 is a unit which manages user information obtained from the user management server 20 or the reproduced version of a portion of the user information. Specifically, it includes a user information inquiry portion 58, a user information search/update portion 59, and a user information notify portion 60. The user information inquiry portion 58 sends a user information obtain request including a specified user ID to the user management server 20 to thereby obtain the user information that is specified by the user ID. The thus obtained user information corresponds to the reproduced user information according to the invention. The user information search/update portion 59 compares the user information obtained by the user information inquiry portion 58 with its corresponding user information which is stored in the user information database 47. The user information search/update portion 59 cooperates with the user information inquiry portion 58 to constitute a compare unit. Further, the user information search/update portion 59, when it compares these two pieces of user information and finds that they are not coincident with each other, functions as an update unit which specifies the contents of the change made on the user information and, using not only content change information corresponding to the specified change content but also the above obtained user information, updates the corresponding content change information and user information stored in the user information database 47. The user information notify portion 60 delivers the after-changed user information and the recorded change log to the invalidation condition portion 55.

The respective composing elements 41 to 43 of the license server 40 can be realized by a cooperative operation to be carried out by a computer forming the license server 40 and a program to be executed by the CPU 1 incorporated into the computer. Also, the respective storage 44 to 48 can be realized by the HDD 4 that is incorporated in the license server 40.

Also, the program to be used in the present embodiment, of course, can be provided by a communication unit, and it also can be provided in such a manner that it is stored in a recording medium such as a CD-ROM or a DVD-ROM which can be read by a computer. The programs, which are provided by the communication unit or from the recording medium, may be installed into the computer and, when the CPU of the computer executes these installed programs sequentially, various processing can be realized.

FIG. 3 is a view of an example of a data structure of user information stored in the user information database 22 of the user management server 20 used in the present embodiment. The user information includes user information (personal information) about individual users using the contents and group information about groups to which the users belong. The user information (personal information) is structured such that, for each user, a user ID serving as information for identifying the user, the group ID of the group to which the user belongs, and other information are made to correspond to each other. Here, the other information includes the name of the user and the like. The group information is structured such that, for each group, a group ID for identifying the group, the name of the group, and a user ID of a user who becomes a member of the group are made to correspond to each other.

FIG. 4 is a view of an example of a data structure of user information stored in the user information database 47 of the license server 40. User information to be stored in the user information data base 47 is user information to be managed by the user management server 20 or reproduced user information generated when a portion of the user information is reproduced. The user information is structured such that, for each user, the user ID of the present user, the group ID of the group to which the user belongs, and the content change information are made to correspond to each other. In the content change information, there is set information for specifying the contents of the change enforced on the user information that is managed by the user management server 20. The content change information will be described later together with an invalidation condition (FIG. 7). Here, the user information to be handled by the license server 40, unless specified otherwise specially, means the user information (personal information) of the user information that is stored in the user information data base 22.

FIG. 5 is a view of an example of a data structure of a change log stored in the user information change log database 48 according to the present embodiment. In the user information change log data base 48, when the user information change log database 48 is updated, the contents of the updated user information are stored as change logs. Each of the change logs includes: the change storage information which consists of a set of the content change information and the changed data or the before-changed data; and, the user ID of a user with his or her user information changed, while the user ID is associated with the change storage information. Here, since the changed log may only make it possible to grasp the contents of the data items such as group IDs that are set before and after changed, the structure of the change log is not limited to the present example.

FIG. 6 is a view of a data structure of policy information stored in the policy database 45 according to the present embodiment. The policy information is set by a user and is also previously set and stored by a security manager. In the policy information, there are set a policy ID, a policy setter, a right and the term of validity. The policy ID is information which is used to identify a policy. In the policy setter, there is set the ID of a user or a group who sets the policy. In the right, there is set an operation which is used to give a right to the policy setter. In the term of validity, there is set the term of validity of the right to be given to the policy setter.

FIG. 7 is a view of an example of a data setting of invalidation conditions stored in the invalidation condition list storage portion 46 according to the present embodiment. The invalidation conditions are previously set and stored by a security manager. In the invalidation condition, there is set a combination of: change content information for specifying the content of the change that has been enforced on the user information; and, a rule for invalidating a license in view of such enforcement of the change on the user information, while the rule is associated with the content change information. In the content change information according to the present embodiment, there are set the following conditions as the conditions that invalidate the license: that is, a [user deletion] condition which means the change that user information about a certain user has been deleted from the user information database 22; a [group member deletion] condition meaning the change that a certain member has been deleted from a certain group whereby, from a group to which user information (personal information) belongs, there has been deleted the group ID of the present group; a [group member addition] condition meaning the change that a certain member has been added to a certain group whereby, into a group to which user information (personal information) belongs, there has been newly stored the group ID of the present group; and, a [group deletion] condition meaning the change that a certain group has been deleted whereby information about this group has been deleted from the group information and the group ID of this group has been deleted from the belonging group of the user information. Of course, the content change information may also be prepared in such a manner that it corresponds to other changes. Here, in FIG. 7, the invalidation conditions are shown using character strings in order to facilitate the understanding of the contents of the changes of the user information and rules; however, in fact, the invalidation conditions are stored using code data or the like which can be processed by a computer. This also applies similarly to other figures which show other databases.

FIG. 8 is a view of an example of a data structure of license information stored in the license database 44 according to the present embodiment. The license information is stored each time when a license is newly issued to a user. And, the license information includes for each license: a license ID serving as information for identifying the present license; the user ID of the user to whom the license is issued; a policy ID set in the present user; and, validity setting information for determining whether the present license is valid or not, while the above elements are made to correspond to each other.

Figure 9:
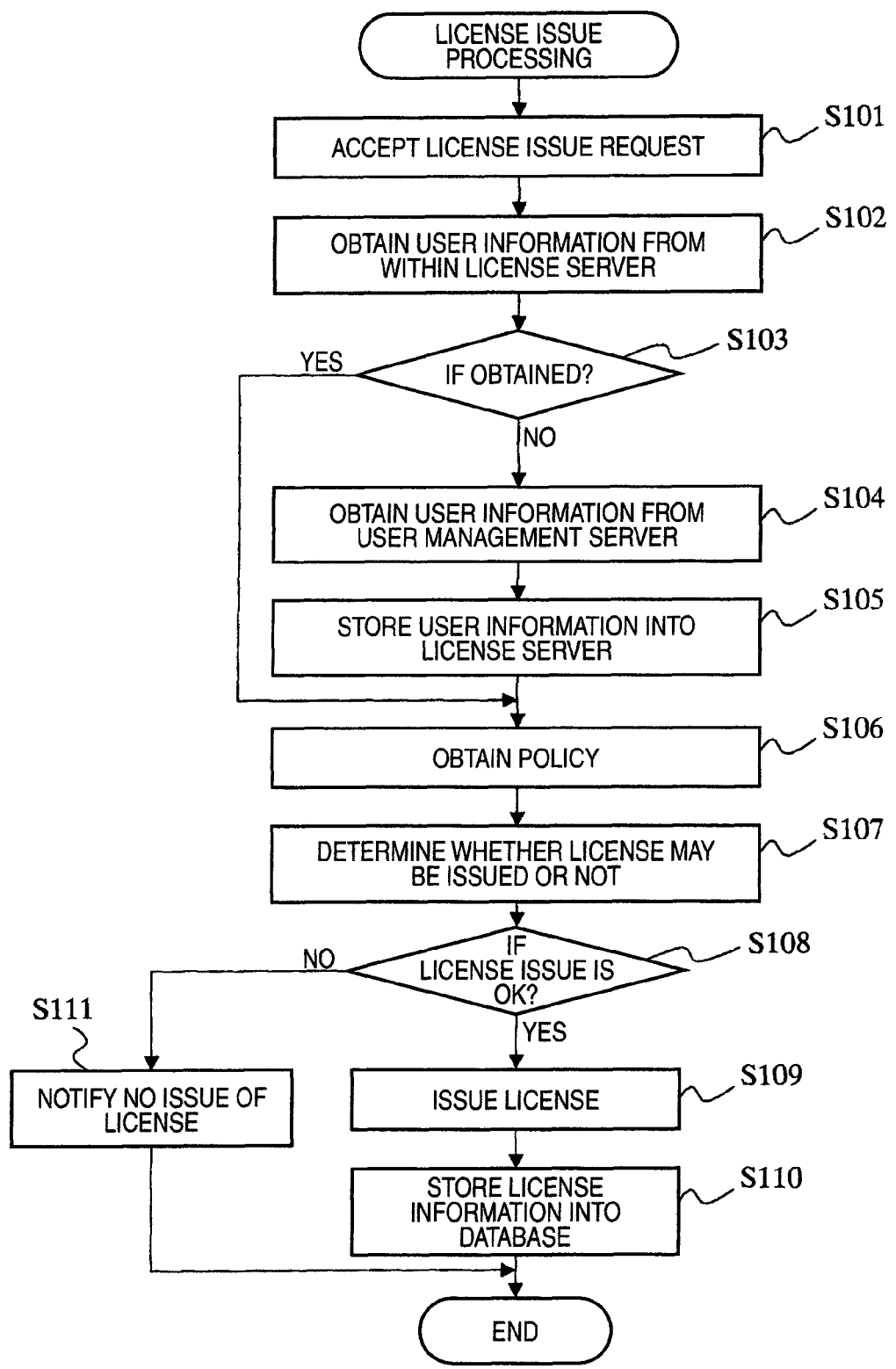
FIG. 9 is a flow chart of a license issue processing according to the present embodiment.

Next, description will be given below of processing which are carried out in the present embodiment. The processing according to the present embodiment are divided roughly into a license issue processing, an invalidation processing for invalidating a license issued, and a license authentication processing. Firstly, description will be given of the license issue processing according to the present embodiment with reference to a flow chart shown in FIG. 9.

The license issue request portion 31 sends a license issue request to the license issue portion 51 of the license server 40. The license issue request contains at least identification information about a content to which the license is to be issued (content ID), identification information about a user who has requested the issue of the license (user ID), and information about the time and data when the license issue is requested. When the license issue portion 51 accepts a license issue request (Step 101), it outputs a user information obtain request to the user information search/update portion 59. The user information search/update portion 59 searches the user information data base 47 according to the user ID contained in the user information obtain request to take out the user information requested (Step 102). When the user information cannot be obtained because it is not stored (in Step 103, N), the user information search/update portion 59 instructs the user information inquiry portion 58 to obtain the user information. According to this instruction, the user information inquiry portion 58 sends a user information obtain request including the present user ID to the user information management portion 21 of the user management server 20.

The user information management portion 21 takes out the user information about the present user from the user information database 22 and return the user information. In the user information to be returned, there should be contained at least the user ID and the group ID of the group to which the user belongs as information which is related to the setting of a policy. When the user information inquiry portion 58 obtains the user information from the user information management portion 21 (Step 104), it delivers the user information to the user information search/update portion 59.

In this manner, when the user information search/update portion 59 obtains the reproduced version of the user information from the user management server 20 through the user information database 47 or user information inquiry portion 58, the user information search/update portion 59 stores the user information into the user information database 47 (Step 105) and also delivers the user information to the license issue portion 51. When the license issue portion 51 delivers the thus received user information to the policy search portion 56, the policy search portion 56 searches the policy database 45 according to the user ID contained in the user information to thereby obtain the policy that corresponds to the present user (Step 106). The policy search portion 56 delivers the thus obtained policy to the license issue portion 51 as the right information of the present user. As the policy that corresponds to the policy of the present user, there are available the policy that is set for the present user and also the policy that is set for the group to which the present user belongs. The license issue portion 51 determines, according to the right information sent thereto, whether a license may be issued or not (Step 107). When it is determined that the license may be issued (in Step 108, Y), the license issue portion 51 generates a license according to the setting contents of the policy and returns the thus generated license to the client terminal 30 which is the requester of the issue of the license (109). The license issue portion 51 further delivers information about the issued license to the license search/update portion 52. The license search/update portion 52 stores this information into the license database 44 (Step 110). When it is determined that the license may not be issued (in Step 108, N), the license issue portion 51 does not issue the license but, instead, notifies a message to the effect that the license cannot be issued (Step 111).

Next, description will be given below of the invalidation processing in which, as the user information is changed, the license issued to the present user is invalidated.

Figure 10:
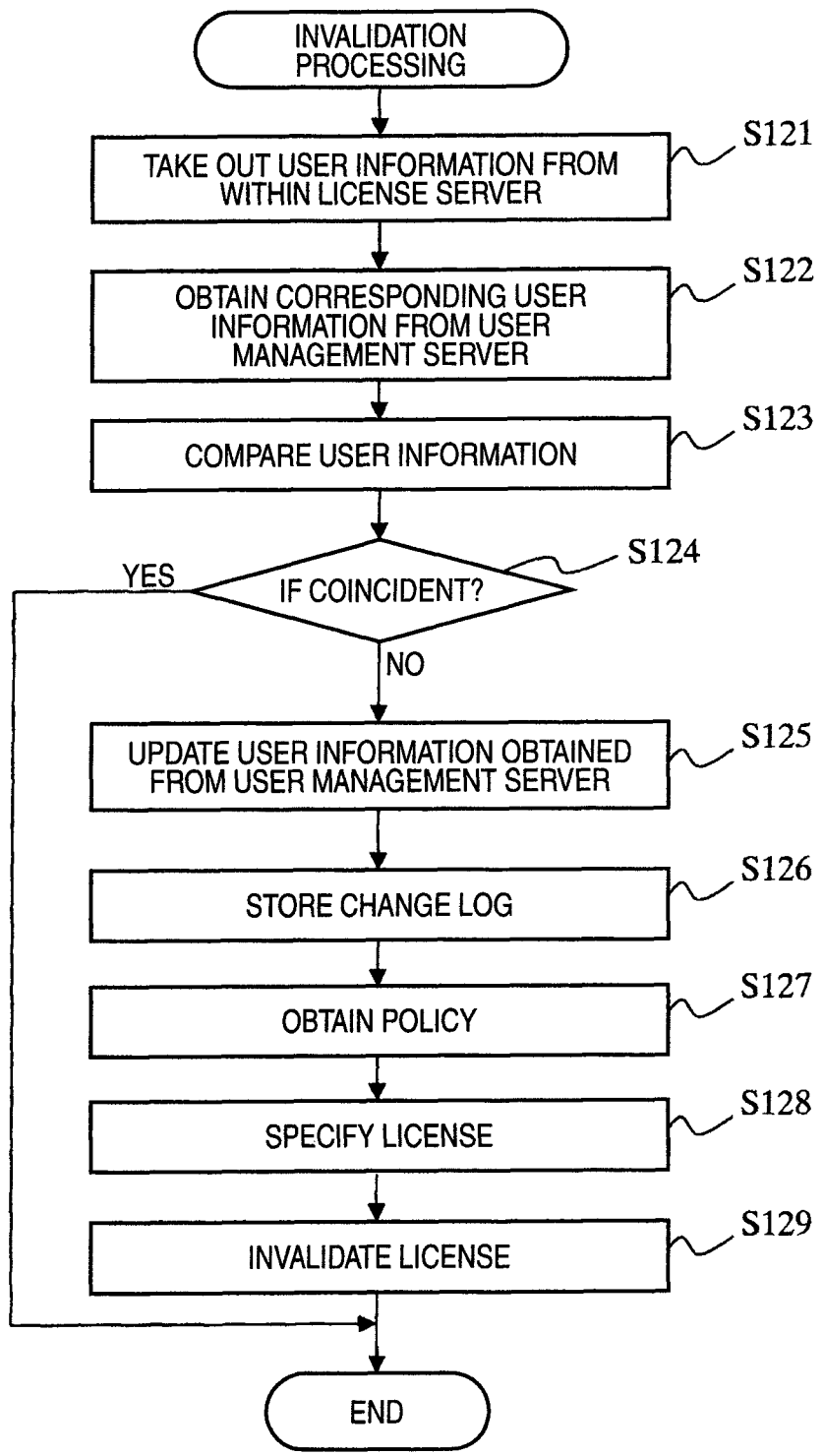
FIG. 10 is a flow chart of an invalidation processing according to the present embodiment.

According to the present embodiment, there is employed an information management method in which the reproduction of user information or a portion thereof managed by the user management server 20 is stored within the license server 40. User information may be inquired of the user management server 20 each time a license issue request is received. However, the user information has a nature that it will not be updated frequently; and, an inquiry about the user information needs a fair processing load. With these reasons taken into account, there is employed the above-mentioned information method. On the other hand, although the update frequency of the user information is low, of course, the user information will be changed when the user account is deleted or when the group to which the user belongs is changed. After the user information being managed by the user management server 20 is changed, when the license server 40 continues to use, as it is, the policy set according to the user information before changed assuming that it is still valid, it is difficult to say that the license management is carried out properly. Thus, the invalidation processing to be described below is the processing that can solve the above problem. In the invalidation processing, the user management server 20 and license server 40 are controlled such that the setting contents of the user information respectively held by the two servers coincide with each other; and, when it is confirmed that these setting contents are not coincident with each other, the license issued to the present user is invalidated. The invalidation processing is carried out cyclically at proper time intervals, for example, once a day. The time interval in this cyclic processing is not limited to this, but it may be set as a proper time interval. Or, it may also be set by the manager's manual operation. Next, description will be given below of the invalidation processing according to the present embodiment with reference to a flow chart shown in FIG. 10. Here, although FIG. 10 shows a flow in which attention is paid on one user formation, the flow shown in FIG. 10 will be repeatedly carried out on all pieces of user information that are stored in the user information database 47.

The user information search/update portion 59 takes out user information from the user information database 47 (Step 121), and it instructs the user information inquiry portion 58 to obtain the user information of the user that can be specified by a user ID contained in the present user information. The user information inquiry portion 58, according to this instruction, sends a user information obtain request including the present user ID to the user information management portion 21 of the user management server 20. When the user information management portion 21 takes out the user information about the present user from the user information data base 22 and sends it back to the user information inquiry portion 58, the user information inquiry portion 58 obtains the user information sent thereto (Step 122), and hands it over to the user information search/update portion 59.

Here, the user information search/update portion 59 compares the user information obtained from the user management server 20 with the user information taken out from the user information database 47 (Step 123). When they are coincident with each other (in Step 124, Y), it can be determined that the user information is not changed, thereby ending the invalidation processing on the present user. On the other hand, when the two pieces of user information are compared with each other and are found that they are not coincident with each other (in Step 124, N), it can be determined that the user information has been changed, thereby executing the following processing.

That is, when the change of the user information is confirmed, the user information search/update portion 59, firstly, updates the user information stored in the user information database 47 according to the user information obtained from the user management server 20 (Step 125). At the then time, the user information search/update portion 59 adds the content change information, which can specify the content of the change made on the user information, to the user information. This content change information is the same as the content change information that is stored in the invalidation condition list shown in FIG. 7. Further, the user information search/update portion 59, in order to store the changed content, combines the user ID contained in the changed user information changed with the content change information and, in the case of the content change relating to the change of group or the like, the before-changed data to thereby generate change storage information; and, it writes this change storage information into the user information change log database 48 while it is associated with the user ID contained in the changed user information, thereby storing a change log (Step 126). The user information search/update portion 59 also delivers the after-changed user information and the stored change log to the user information notify portion 60. The user information notify portion 60 delivers the after-changed user information and the stored change log to the invalidation condition check portion 55. The invalidation condition check portion 55 searches the invalidation condition list storage portion 46 using the change content information included in the user information as a key to thereby specify a rule to invalid a license, creates a policy search condition related to the present user according to the thus specified rule, and delivers the thus created policy search condition together with the user information to the policy search portion 56. The search condition includes, as the information that can be made to be policy invalidation information due to the change of the user information, the user ID and the ID of a group to which the present user belongs before and after the user information is changed. When the policy search portion 56 searches the policy database 45 according to the thus received information to thereby obtain a policy related to the present user (Step 127), the policy search portion 56 delivers the thus obtained user-related policy to the license invalidation instruct portion 57 together with the user information and change log respectively delivered from the invalidation condition check portion 55. Here, the policy related to the present user corresponds to a policy set for the present user and a policy set for a group to which the present user belongs, both of which have been described previously. The license invalidation instruct portion 57 delivers the thus obtained policy, user information and change log to the license invalidation portion 54. The license invalidation portion 54 specifies a license, which corresponds to a policy ID contained in the policy of the license search/update portion 52 and a user ID contained in the user information, from the license search/update portion 52 (Step 128), and carries out an invalidation processing on such license. Specifically, the license invalidation portion 54 sets the validity setting information of the present license for "invalid" to thereby update a license set in the license database 44 (Step 129). Referring to which license is to be set invalid, the invalidation condition may be searched according to the content change information associated with the user ID contained in the user information, thereby being able to specify a rule. Thus, the license invalidation portion 54 invalidates the corresponding license according to the description content of the thus specified rule.

For example, when "User A" is deleted from the user information database 22, that is, when the content change information is "1", of licenses stored in the license database 44 according to a rule set for an invalidation condition, the validity setting information about all of licenses issued to the "User A" is set for "invalidation". Also, when the "User A" is deleted from "Group A", that is, when the content change information is "2", of licenses stored in the license database 44 according to a rule set for an invalidation condition, validity setting information about a license, in which the policy ID of a policy set in the "Group A" is set in the policy ID thereof and the "User A" set in the user ID thereof, is set for "invalidity". Also, when a group belonging to the "Group A" is newly added to and below a group belonging to "Group B, that is, when the change content information is "3", of licenses stored in the license database 44 according to a rule set for an invalidation condition, validity setting information about a license, in which the policy ID of a policy set for the "Group A" is set in the policy ID thereof, is set for "invalidity". That is, all of licenses belonging to the "Group A" are invalidated. Also, when the "Group A" is deleted from the user information database 22, that is, when the content change information is "4", of licenses stored in the license database 44 according to a rule set for a invalidation condition, validity setting information about a license, in which the policy ID of a policy set for the "Group A" is set in the policy ID thereof, is set for invalidity. In this case as well, all of licenses belonging to the "Group A" are invalidated.

In the present embodiment, the invalidating processing on the relevant licenses is executed in linking with the change of the user information in the above-mentioned manner.

Figure 11:
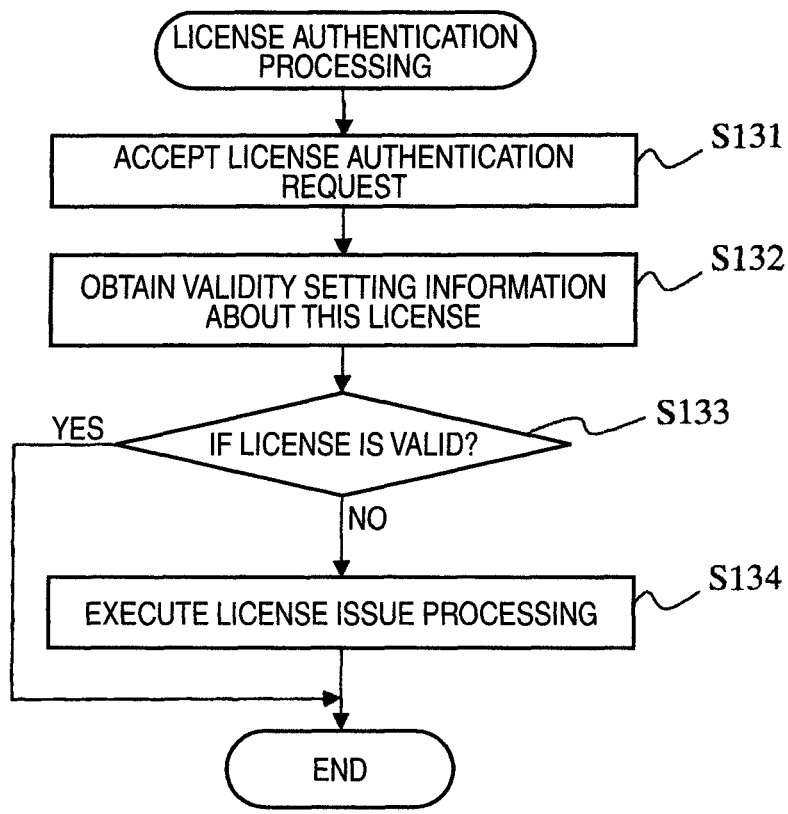
FIG. 11 is a flow chart of a license authentication processing according to the present embodiment.

Next, description will be given below of a flow chart shown in FIG. 11 relating to a license authentication processing according to the present embodiment.

When the license authentication request portion 33 of the client terminal 30 sends a license authentication request to the license server 40 according to an authentication request instruction from a user, the license authentication portion 53 of the license server 40 accepts the license authentication request (Step 131). The license authentication request includes at least the user ID of a user who has made such an authentication request and the license ID of the user. And, when the license authentication portion 53 delivers the thus accepted user ID and license ID to the license search/update portion 52, the license search/update portion 52 searches the license data base 44 using the accepted user ID and license ID as a key to thereby obtain the validity setting information of the present license (Step 132), and then returns it to the license authentication portion 53. Here, when it is confirmed from the accepted validity setting information that the present license is valid (in Step 133, Y), the license authentication portion 53 returns, to the client terminal 30 which is the sender of the request, the authentication result to the effect that the license is valid (Step 134). On the other hand, when the license is found invalid (in Step 133, N), the above-mentioned license issue processing is carried out (Step 134). Here, in the case of this license authentication processing, the sender, who sends a license issue request to the license issue portion 51 in Step 101, is not the client terminal 30 but the license authentication portion 53. Also, in Step 109, the license issue portion 51 sends an instruction to invalidate a license to be invalidated together with the license to be issued.

In the present embodiment, when there is given a license authentication request, there is given an instruction to invalidate a license to be invalidated and also, if there exists a license which is valid due to the policy setting, a new license is to be issued.

Here, according to the present embodiment, the policy and license are managed by the license server 40. However, these structures may also be realized in such a manner that they are decentralized into multiple computers. Also, when at least one of the storage 44 to 48 is accessible from the license server 40, such management may not be always realized by the HDD 4 of the license server 40.

Also, in the present embodiment, a license to be stored into the license data base 44 can be checked whether it is valid or not, in such a manner that validity setting information is made to correspond to license information about the license. However, the validity setting information may also be structured such that it is held by another structure.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A license management apparatus comprising:
    a database of user information, the user information comprising at least one of a user identification (ID) of a user and a group ID of a group of users to which the user belongs;
    a license database, the license database associating the user information with a license issued to the user;
    a license invalidation condition database, the license invalidation condition database associating a license invalidation condition that identifies a change of the user information with a license invalidation rule for invalidating the license; and
    a processor that executes instructions causing the license management apparatus to execute a license invalidation process of invalidating the license comprising:
        reading the user information from the database of user information;

requesting a user management server for corresponding user information of the user that corresponds to the user information, the user management server managing a user information database storing the corresponding user information;

receiving the corresponding user information from the user management server;

comparing the user information and the corresponding user information;

detecting a difference between the user information and the corresponding user information based on a result of the comparing;

determining that the difference corresponds to the change of the user information identified by the license invalidation condition; and applying the license invalidation rule associated with the license invalidation condition to the license regularly in response to determining that the difference corresponds to the change of the user information identified by the license invalidation condition.

2. The license management apparatus as claimed in claim 1, further comprising:

a policy database that stores a policy associating the user information with at least one of a right of the license to access content and a term of validity of the license, wherein the processor executes instructions causing the license management apparatus to accept a license authentication request to validate the license, determines that the license is invalid by searching the license database, searches the policy database according to the user information, determines that the license can be issued based on the policy, issues the license to the user, and stores the license in the license database.

3. The license management apparatus as claimed in claim 1, wherein the license associates the license with validity setting information expressing validity of the license, and applying the license invalidation rule comprises setting the validity setting information to indicate that the license is invalid.

4. A license management apparatus according to claim 1, wherein the invalidation process further comprises updating the user information of the database of user information with the corresponding user information received from the user management server.

5. The management apparatus according to claim 1, wherein the change of the user information comprises at least one of deletion of the user information, deletion of the user from the group, addition of the user to the group, and deletion of the group.

6. The management apparatus according to claim 1, wherein a range of the license to be applied the license invalidation rule is specified.

7. The management apparatus according to claim 1, wherein the license is applied the license invalidation rule each time the difference corresponding to the change of the user information is determined.

8. A license management method comprising:

storing user information in a database of user information, the user information comprising at least one of a user identification (ID) of a user and a group ID of a group of users to which the user belongs;

storing the user information in association with a license issued to the user, in a license database;

associating a license invalidation condition that identifies a change of the user information with a license invalidation rule for invalidating the license, in a license invalidation condition database; and invalidating the license, by a processor, the invalidating comprising:

reading the user information from the database of user information;

requesting a user management server for corresponding user information of the user that corresponds to the user information, the user management server managing a user information database storing the corresponding user information;

receiving the corresponding user information from the user management server;

comparing the user information and the corresponding user information;

detecting a difference between the user information and the corresponding user information based on a result of the comparing;

determining that the difference corresponds to the change of the user information identified by the license invalidation condition; and applying the license invalidation rule associated with the license invalidation condition to the license regularly in response to determining that the difference corresponds to the change of the user information identified by the license invalidation condition.

9. A non-transitory computer readable medium storing a program causing a computer to execute a process for managing license information, the process comprising:

storing user information in a database of user information, the user information comprising at least one of a user identification (ID) of a user and a group ID of a group of users to which the user belongs;

storing the user information in association with a license issued to the user, in a license database;

associating a license invalidation condition that identifies a change of the user information with a license invalidation rule for invalidating the license, in a license invalidation condition database; and invalidating the license, the invalidating comprising:

reading the user information from the database of user information;

requesting a user management server for corresponding user information of the user that corresponds to the user information, the user management server managing a user information database storing the corresponding user information;

receiving the corresponding user information from the user management server;

comparing the user information and the corresponding user information;

detecting a difference between the user information and the corresponding user information based on a result of the comparing;

determining that the difference corresponds to the change of the user information identified by the license invalidation condition; and applying the license invalidation rule associated with the license invalidation condition to the license regularly in response to determining that the difference corresponds to the change of the user information identified by the license invalidation condition.

10. A non-transitory computer readable medium storing a program causing a computer to execute a process that is performed on a content licensing managing server that stores user information for each of a plurality of users, the user information including a user identification (ID), a group ID of a group to which the user belongs, and content information, the content licensing managing server also storing, along with, for each user, one or more license information, the process comprising:
- periodically performing by the content licensing managing server the operations of:
- for each the user IDs stored in the content licensing managing server, sending a request to a user management server for user information that is stored on the user management server and associated with the user ID;
- receiving a response to the request, the response including the user information that is stored on the user management server;
- comparing the user information included in the response with the user information associated with the user ID that is stored on the content licensing management server to determine whether changed information exists;
- in response to determining changed information exists, updating the user information stored in the content licensing management server with the user information received in the response, and generating and storing a change log which includes the user ID, the changed information, and information before the change; and
- determining, for each licensing information associated with the user ID, whether the licensing information is to be invalidated based on the information stored in the change log that is associated with the user ID, and if the licensing information is to be invalidated, setting the licensing information stored on the licensing management server as invalid.

\* \* \* \* \*